United States Patent
Ludwig et al.

(10) Patent No.: US 10,532,540 B2
(45) Date of Patent: Jan. 14, 2020

(54) VEHICLE ROOF GLASS ELEMENT, METHOD AND TOOL FOR MANUFACTURING A VEHICLE ROOF GLASS ELEMENT

(71) Applicant: Roof Systems Germany GmbH, Dietzenbach (DE)

(72) Inventors: Matthias Ludwig, Vechelde (DE); Joachim Röder, Mühlheim (DE); Maximilian Kirchner, Schlüchtern (DE)

(73) Assignee: ROOF SYSTEMS GERMANY GMBH (DE)

( * ) Notice: Subject to any disclaimer, the term of this patent is extended or adjusted under 35 U.S.C. 154(b) by 199 days.

(21) Appl. No.: 15/381,446

(22) Filed: Dec. 16, 2016

(65) Prior Publication Data

US 2017/0203546 A1 Jul. 20, 2017

(30) Foreign Application Priority Data

Dec. 16, 2015 (DE) .................. 10 2015 121 927

(51) Int. Cl.
| | | |
|---|---|---|
| *B32B 3/10* | (2006.01) | |
| *B32B 17/06* | (2006.01) | |
| *B29C 45/14* | (2006.01) | |
| *B32B 5/20* | (2006.01) | |
| *B60J 7/043* | (2006.01) | |

(Continued)

(52) U.S. Cl.
CPC ...... *B32B 17/066* (2013.01); *B29C 45/14639* (2013.01); *B29C 45/14778* (2013.01); *B32B 5/20* (2013.01); *B60J 7/043* (2013.01); *B29C 2045/14868* (2013.01); *B29K 2075/00* (2013.01); *B29K 2105/04* (2013.01); *B29K 2995/0015* (2013.01); *B29K 2995/0026* (2013.01); *B29L 2031/3052* (2013.01); *B32B 2307/304* (2013.01); *B32B 2307/412* (2013.01); *B32B 2605/08* (2013.01); *B62D 25/06* (2013.01)

(58) Field of Classification Search
None
See application file for complete search history.

(56) References Cited

U.S. PATENT DOCUMENTS

| | | |
|---|---|---|
| 4,786,784 A | 11/1988 | Nikodem et al. |
| 5,137,770 A | 8/1992 | Rothe et al. |

(Continued)

FOREIGN PATENT DOCUMENTS

| | | |
|---|---|---|
| CN | 88100933 A | 12/1988 |
| DE | 202004003468 U1 | 7/2004 |

(Continued)

OTHER PUBLICATIONS

Machine translation of DE-102007009039-A1 (Year: 2008).*

(Continued)

*Primary Examiner* — Christopher M Polley
(74) *Attorney, Agent, or Firm* — Dilworth IP, LLC

(57) ABSTRACT

A vehicle roof glass element having an exterior glass pane and a transparent insulating layer foamed on the inside onto the glass pane has an externally circumferential rim the runner points and the ventilation points of which are provided on the inside of the glass pane. Furthermore, a method and a tool for manufacturing a vehicle roof glass element are described.

19 Claims, 3 Drawing Sheets

(51) Int. Cl.
  *B29K 75/00* (2006.01)
  *B29K 105/04* (2006.01)
  *B29L 31/30* (2006.01)
  *B62D 25/06* (2006.01)

(56) References Cited

U.S. PATENT DOCUMENTS 5,443,673 A * 8/1995 Fisher ................... B29C 43/18
  156/245
2007/0246973 A1 * 10/2007 Huebner .................. B60J 7/00
  296/216.09
2007/0275216 A1 * 11/2007 Grimm ............ B32B 17/10036
  428/192
2011/0031647 A1 * 2/2011 Nakata ............. B29C 45/14434
  264/265

FOREIGN PATENT DOCUMENTS

| DE | 102007009039 A1 * | 8/2008 | ......... B29C 44/1228 |
| DE | 102007009039 A1 | 8/2008 | |
| DE | 102011053166 A1 | 2/2013 | |
| EP | 0422516 A1 | 4/1991 | |
| EP | 0576179 A1 | 12/1993 | |
| EP | 1859931 A1 | 11/2007 | |
| EP | 1894901 A1 | 3/2008 | |
| EP | 2253447 A1 | 11/2010 | |

OTHER PUBLICATIONS

English Abstract for DE102007009039.
English Abstract for DE202004003468.
English Abstract for EP0422516.
DE Application No. 10 2015 121 927.1 Office Action dated Aug. 12, 2016.
DE102007009039 English Machine Translation.
English Machine Translation to DE 202004003468.
English Summary of DE Office Action dated Aug. 12, 2016.
English Translation to Abstract for DE102011053166.
English Translation to Abstract for EP1859931.
European Search Report for Application No. EP 16 20 4410.

* cited by examiner

VEHICLE ROOF GLASS ELEMENT, METHOD AND TOOL FOR MANUFACTURING A VEHICLE ROOF GLASS ELEMENT

CROSS REFERENCE TO RELATED APPLICATIONS

This application claims priority under 35 U.S.C. 119 to the following German Patent Application No. DE 10 2015 121 927.1 filed on Dec. 16, 2015, the contents of which are incorporated herein by reference thereto.

TECHNICAL FIELD

The invention relates to a vehicle roof glass element having an exterior glass pane and a transparent insulating layer foamed on the inside onto the glass pane and a circumferential frame which is provided on the interior rim portion of the glass pane and applied thereon by injection molding or foaming and which extends up to the rim.

The invention furthermore relates to a method and to a tool for manufacturing such a vehicle roof glass element.

BACKGROUND

Vehicle roof glass elements are used in panoramic roofs or in vehicle tilting and/or sliding roofs. The manufacture of a vehicle roof glass element of this type is usually realized in that first the glass pane is manufactured and a circumferential frame made of PUR material is applied on the inside onto the glass pane by injection molding or foaming. The frame produces the required stability for the vehicle roof glass element, further reinforcing parts being usually embedded therein which are made of metal and permit the coupling of a movable vehicle roof glass element to a drive and the fastening of the vehicle roof glass element to the vehicle roof. The application by injection molding or foaming to form the frame is usually performed such that the glass pane is inserted into a lower part of an injection molding or foaming tool and then forms along with an upper part a cavity produced around the glass pane into which the soft plastic material is introduced. In order to avoid large gas pockets, an aspiration is performed or an exit of PUR material permitted. The material feed for the soft PUR material and/or the aspiration are usually performed in the region of the intersection between the upper and the lower part of the tool in the region of the side face of the glass pane and of the resulting frame. Laterally projecting runner points or ventilation points formed by a projecting hard PUR material are then produced after curing. These projecting portions are removed by chip-forming machining.

The object of the invention is to propose a vehicle roof glass element the manufacture of which is cost-effective, and a method for the manufacture thereof.

BRIEF SUMMARY

This is obtained in a vehicle roof glass element of the type initially mentioned in that all runner points and ventilation points of the frame are provided on the inside of the glass pane. Due to this new arrangement of the runner and ventilation points, it is not necessary that the frame which also covers the side face of the glass pane pointing outwards is mechanically post-processed in this region, which is particularly expensive and furthermore results in a rougher surface. The surface towards the tools is actually very smooth upon casting or injection molding, and this smooth surface is destroyed by the chip-forming machining. Furthermore, it is possible to accurately manufacture the vehicle glass element concerning its circumferential geometry and the dimensions thereof, since a mechanical post-processing is no longer necessary in the circumferential region of the frame. The insulating layer itself is transparent and provides for a sound insulation and a tinting of the glass pane, for example, such that a UV and/or IR filter are formed thereby.

The transparent insulating layer should at least cover the entire surface of a see-through area of the glass pane in which the finished glass element is transparent. This usually central region of the glass pane is then surrounded by a non transparent rim portion formed by the frame.

Optionally, a ceramic layer may be applied on the inside onto the glass pane below the entire rim portion, i.e. directly onto the glass pane. This ceramic layer is usually a black print which improves, one the one hand, the adhesion of the material of the frame and, on the other hand, prevents the view from the outside onto the foaming or injection molding material of the frame such that a high quality general impression from the outside is produced also in the region of transition from the transparent part, the see-through area, to the frame.

Optionally, it is of course also possible to provide a primer or activator layer between the glass pane and the transparent insulating layer.

In particular a single-pane safety glass is used as a glass pane, which has higher internal stresses than laminated glass, is easier to process and is positioned in a more stable manner in the tool.

The frame can and should preferably entirely cover the glass pane on its circumferential side face pointing outwards such that the side face is exposed nowhere. This means that the frame preferably extends towards the front side and is thus flush therewith.

A prefabricated or several prefabricated reinforcing parts in particular made of metal can be embedded into the rim. These reinforcing parts can purely be provided for the reinforcement of the vehicle roof glass element or for the coupling to the vehicle roof or to a drive mechanism. This reinforcing part can be configured without distance piece towards the vehicle roof, i.e. no separate part is necessary between the glass pane and the reinforcing part. The reinforcing part however has no direct contact with the glass pane, which otherwise could lead to punctual stresses. An option for avoiding this direct contact consists in providing merely the insulating layer between the glass pane and the reinforcing part. The insulating layer thus extends also up to below the frame.

A PUR layer, in particular having a so-called reflow effect can be provided as an insulating layer. This reflow effect ensures that the surface is self-closing, for example when a scratching along it with the fingernail or when an impressing on the insulating layer occurs. This increases the continuous quality of the vehicle roof glass element. Incidentally, such a material having a self-healing surface is also very well adapted as a sound insulating material.

The insulating layer and the ceramic layer can be applied directly onto the glass pane in sections such that intermediate layers may be avoided. A further advantage consists in that the frame can be placed partially onto the ceramic layer, partially onto the glass pane and partially onto the insulating layer. Several bonding portions can therefore be realized, i.e. if one of these bonds between two materials actually detaches, the others would be present as security.

The insulation layer can also extend up to the rim of the glass pane. The frame is then directly connected with the glass pane only at the outwardly pointing side face, the remaining part being connected with the insulating layer. The aforementioned ceramic layer can also be present below the insulating layer in the region of the frame. In this case, two different bonds are present for the coupling of the frame to the glass pane, namely the direct bond of the material of the frame to the glass pane in the region of the side face pointing outwards, and the bond between the material of the frame and the insulating layer. However, the insulating layer itself then also includes two bonds, namely directly to the glass pane in the region of the transparent see-through area and to the ceramic layer in the region of the frame.

Preferably, the frame is mechanically unmachined. This can be permitted in that the runner and ventilation points simply break up on the inside of the frame upon demolding. A corresponding positioning and dimensioning of the runner points and ventilation points permit such a cost-effective manufacturing variant.

The aforementioned object is also achieved by a method of manufacturing a vehicle roof glass element having an exterior workpiece-side glass pane and an transparent insulating layer which is foamed on the inside onto the workpiece-side glass pane and a circumferential frame which is provided on the interior rim portion of the workpiece-side glass pane and applied thereon by injection molding or foaming. The method according to the invention is in particular used to manufacture a vehicle roof glass element according to the invention and is characterized by the following steps:

a) positioning a workpiece-side glass pane onto a lower tool piece, b) closing the tool by an upper mold which is formed by a tool-side glass pane at least in sections and has at least the camber geometry of the inserted workpiece-side glass pane at least in the area of an insulating material which is to be applied thereon, and c) foaming a transparent insulating material in a planar manner onto the inside of the workpiece-side glass pane so as to form a continuous transparent insulating layer at least in a see-through area of the vehicle roof glass element.

The method according to the invention provides to replace at least most part of the upper mold, namely in the region of the contact with the insulating material, with a glass pane. This glass pane (referred to as tool-side glass pane below) is one of the previously produced glass panes as a potential piece of the vehicle roof glass element. It is therefore possible to produce the extremely expensive molds in a very inexpensive manner. Merely the glass pane itself as an upper mold or the glass pane with an exterior frame are possibly required, which then forms the entire or nearly the entire upper mold. A further advantage of this solution consists in that the surface of the upper mold is of particularly high quality due to the glass. At most bores may be provided in the glass pane by means of which the runner and/or ventilation points are formed. The manufacture of these bores is however primitive, the bores leading to no noteworthy expenses.

In the method according to the invention, it is not absolutely necessary that a primer is used for applying the frame by injection molding or foaming and/or that an activator is deposited on the inside of the workpiece-side glass pane before foaming the transparent insulating layer. It is also possible to realize an injection molding or foaming directly onto the glass pane.

After the manufacture of the transparent insulating layer, it is possible to apply a circumferential frame by foaming or injection molding, a runner or aspiration point for the material to be introduced being provided in the region of the rim portion on the inside of the glass pane upon casting or foaming, as already described above with respect to the vehicle roof glass element according to the invention.

In this foaming process for the manufacture of the frame, a tool piece for sealing is preferably pressed directly against the transparent insulating layer such that complex seals are not absolutely necessary in the tool. The insulating layer made of plastic material gives the required flexibility and the required impression depth which permits to press the tool against the previously manufactured unit made of the glass pane and the insulating layer in a sealing manner and to seal it here.

A chip-forming post-processing of the vehicle roof glass element does no longer take place after the manufacture of the frame.

The present invention finally relates to a tool for manufacturing a vehicle roof glass element in accordance with the invention, having a lower tool piece for positioning a workpiece-side glass pane and an upper mold which is formed at least in sections by a tool-side glass pane having the camber geometry of the inserted glass pane at least in the area of the insulating layer to be deposited. The advantages mentioned above in connection with the method according to the invention are also applicable here. The tool-side glass pane which forms at least portions of the upper mold may include bores for forming runner and/or ventilation points.

BRIEF DESCRIPTION OF THE DRAWINGS

Further features and advantages of the invention result from the description below and from the drawings below to which reference is made.

The drawings show.

DETAILED DESCRIPTION

Figure 1:
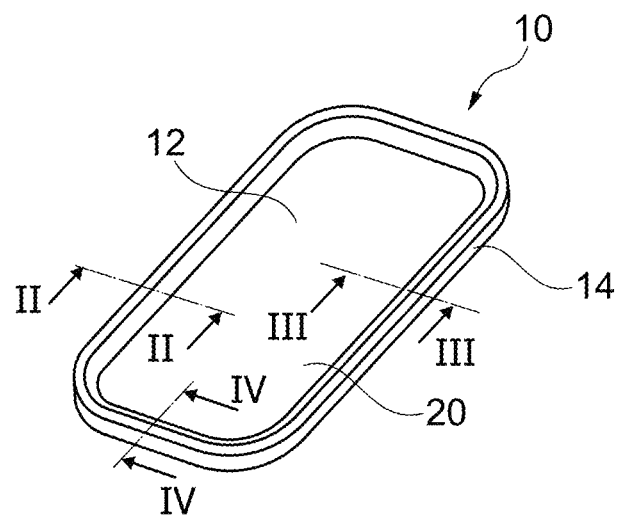
FIG. 1 a perspective top view on a vehicle roof glass element according to the invention, FIG. 2 a sectional view along the line II-II of FIG. 1 in the area of the front rim of the vehicle roof glass element, FIG. 3 a sectional view along the line III-Ill in Figure in the region of the rear rim of the vehicle roof glass element, FIG. 4 a sectional view along the line IV-IV in FIG. 1 in the area of a lateral rim of the vehicle roof glass element, FIG. 5 a sectional view through a tool according to the invention for manufacturing a vehicle roof glass element in which the insulating layer is applied by foaming, and FIG. 6 a sectional view through a tool for manufacturing the frame as used in the method in accordance with the invention.

FIG. 1 shows a vehicle roof glass element which is the shiftable workpiece-side glass cover of a vehicle sliding or vehicle tilting roof or the glass cover of a panoramic roof, for example.

On the outside, the vehicle roof glass element 10 is formed by a glass pane 12 which is in particular made of single-pane safety glass defining at least nearly the entire or the entire exterior side of the vehicle roof glass element 10.

The glass pane 12 is stabilized on the inside by a closed and circumferential frame 14 which is manufactured by injection molding or foaming.

In the present case, the frame 14 is a non transparent frame which is preferably made of PUR material foamed in a rim portion onto the glass pane 12.

Figure 2:
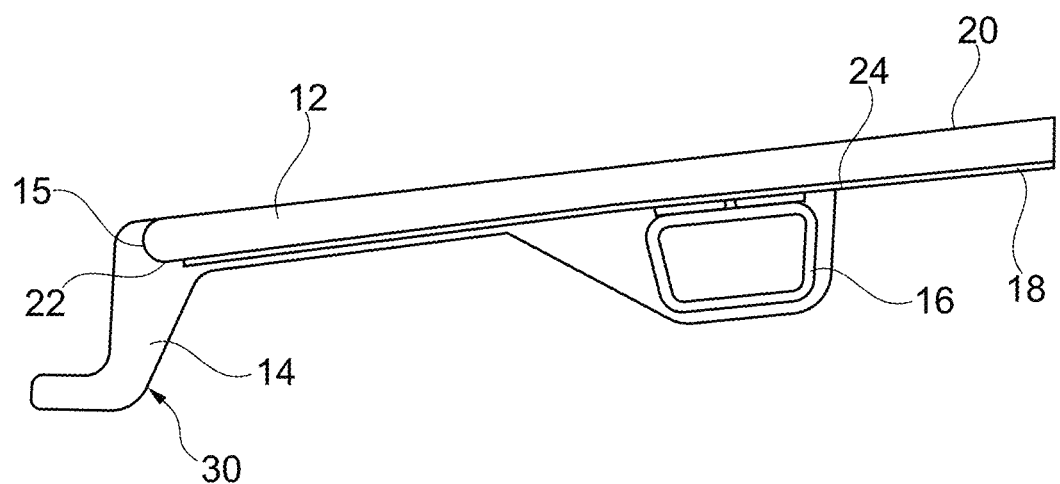
Figure 3:
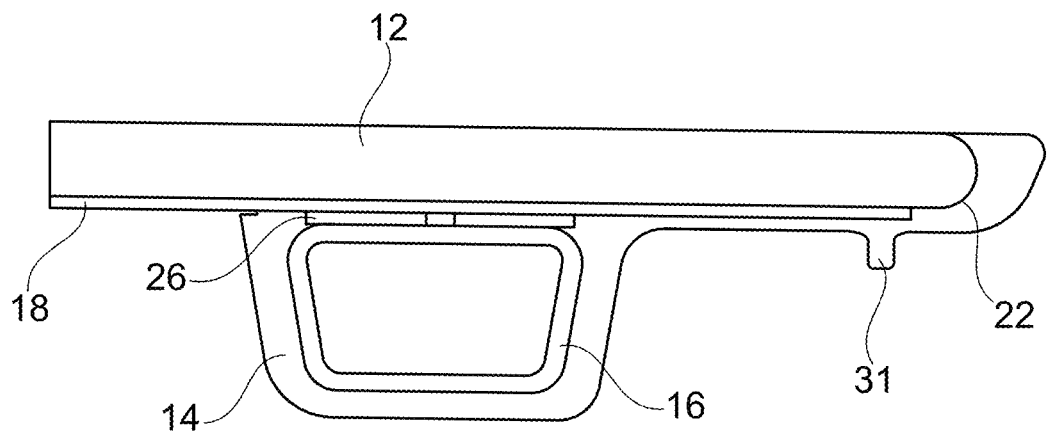
Figure 4:
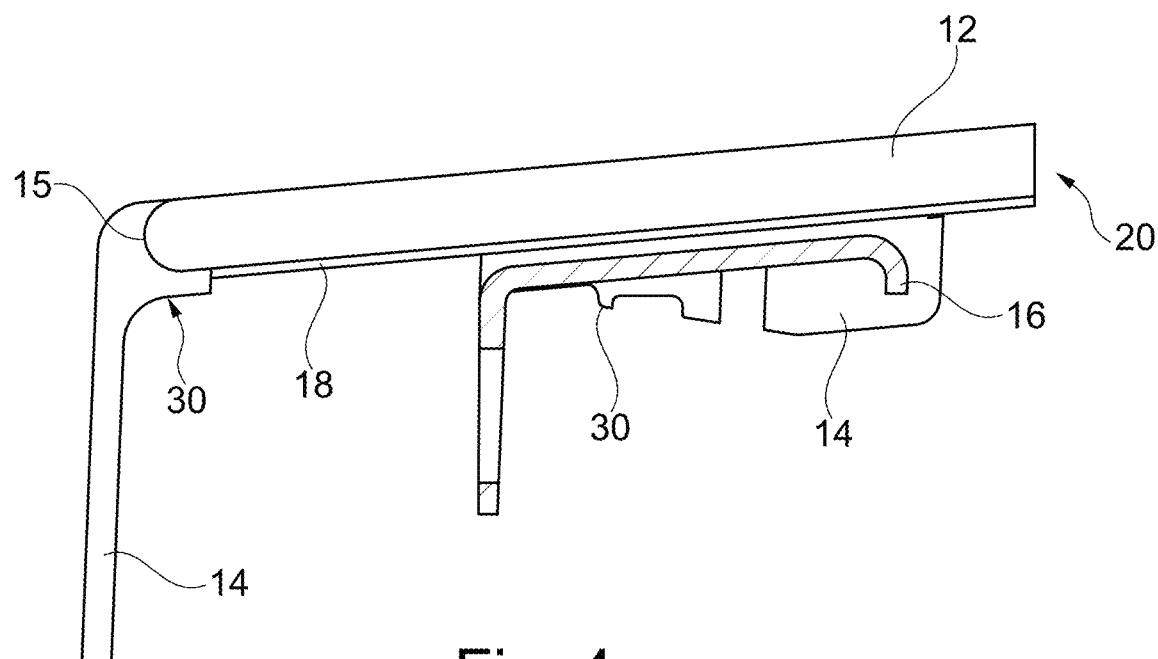

As can be seen in FIGS. 2 to 4, the frame 14 extends at the outwardly facing side faces 15 of the glass pane 12 and on the inside of the glass pane 12.

Several reinforcing parts 16 made of metal are embedded into the PUR material which forms the frame 14. FIGS. 2 and 3 show tubular, elongated reinforcing parts 16 which are embedded into the frame 14 and are spaced apart from the glass pane 12.

Optionally, an insulating layer 18 foamed on the inside onto the glass pane 12 (irrespective of whether a primer is additionally provided or not) is in direct contact with the glass pane 12 and is made of a plastic material having a so-called reflow effect. The insulating layer 18 is therefore relatively soft and can be slightly impressed using a fingernail, this impression point automatically closing again after a while.

The insulating layer 18 serves to form a sound insulation and/or a UV and/or an IR filter, for example.

In the so-called central see-through area 20 (see also FIG. 1) of the vehicle roof glass element 10 which is enclosed by the frame 14, the vehicle roof glass element 10 is actually transparent and is formed in this region merely by the glass pane 12 and the transparent insulating layer 19 which entirely covers this region of the glass pane 12.

The insulating layer extends up to or up to close to the so-called rim 22 which constitutes the transition from the inside to the side face 15. On the inside, the rim portion adjoins the rim 22.

A ceramic layer which extends from the interior end 24 of the frame 14 up to the rim 22 and which covers the inside of the circumferential rim portion of the glass pane 12 is directly applied onto the glass pane 12, more specifically below the frame 14. The ceramic layer is preferably black and does not permit a view from the outside onto the PUR material of the frame. However, since the ceramic layer is extremely thin, it is not visible in FIGS. 2 to 4.

Furthermore, as can be seen in FIGS. 2 and 3, the reinforcing part 16 or parts 26 connected therewith rest on the insulating layer 18 without having to provide distance pieces as separate prefabricated parts which ensure a distance to the glass pane 12 for the reinforcing parts 16.

It is optionally possible to apply a primer and/or an activator onto the ceramic layer which also increases the UV resistance of the PUR material, before the PUR is then applied by foaming to form the frame 14.

It is of course also possible to apply a primer and/or activator layer on the inside onto the entire glass pane before applying the insulating layer 18. This also serves to improve adhesion.

A protective film is not provided.

The transparent insulating layer 18 preferably has a constant thickness, in particular in the range of 0.5 to 1.5 mm.

In the section according to FIG. 4, it can be seen that the reinforcing part 16 is configured as an angled metal sheet, one leg being embedded into the frame 14 and one leg projecting out of the appropriate PUR material in order to be coupled to the drive of the vehicle sliding and/or tilting roof in this area.

In the region of the lateral rims which can be seen in FIG. 4, the frame 14 may also include portions which do not merge into each other, here an outer portion extending from the side face 15 and a spaced apart inner portion, for example, into which the reinforcing part 16 is embedded.

The frame 14 is mechanically unmachined, and the runner points and ventilation points 30 and 31 are exclusively provided on the inside of the glass pane 12 upon injection molding or casting for the manufacture of the frame.

Figure 5:
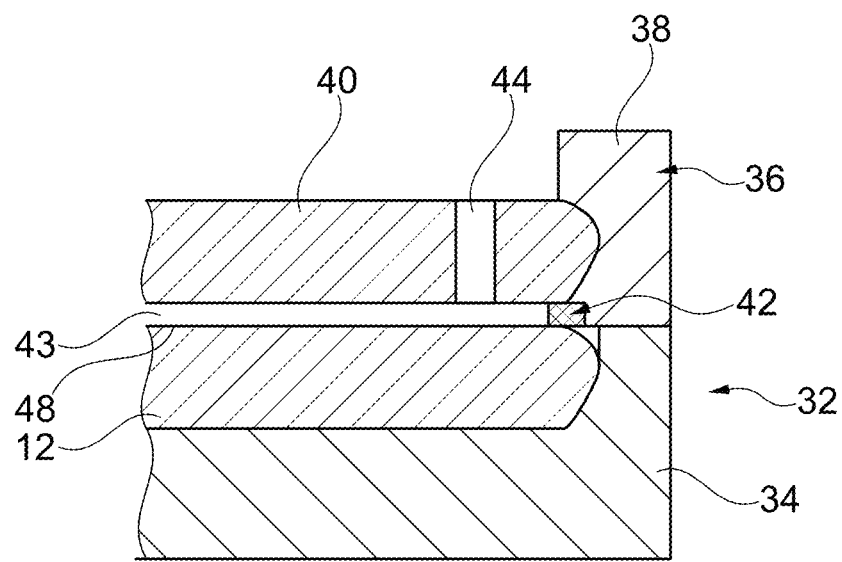
Figure 6:
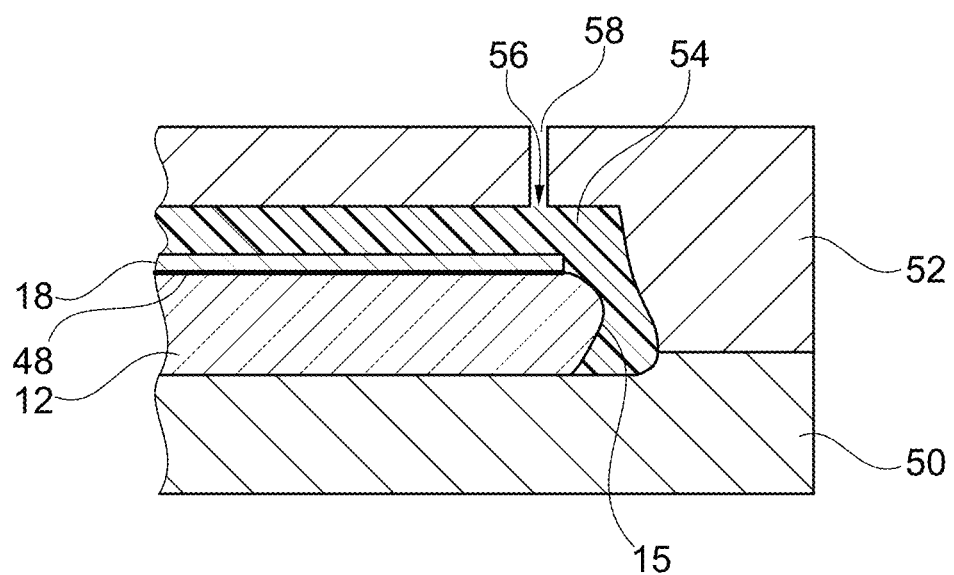

The manufacture of the vehicle roof glass element is shown with reference to FIGS. 5 and 6, namely substantially in two steps.

FIG. 5 shows a tool 32 into which the workpiece-side glass pane 12 is inserted, more specifically into or onto a so-called lower tool part 34 which may be a lower mold half. The rear side of the glass pane faces to the top. The insulating layer 18 is then applied in this tool 32.

The upper mold 36 (possibly the mold half) comprises a frame 38 in which a further tool-side glass pane 40 is accommodated and fastened thereto. With regard to the camber geometry, the glass pane 40 corresponds exactly to the inserted glass pane 12 at least in the region of the insulating layer 18 to be applied, and may even be an identical component the manufacture of which is very cost-effective. The further glass pane 40 is therefore part of the upper mold half 36.

A seal 42 on the frame 38 seals the upper mold 36 with respect to the glass pane 12, a small gap 43 being formed between the glass panes 12 and 40. Optionally, the glass pane 40 may have a plurality of openings 44 for introducing liquid plastic material into the cavity present between the tool 32 and the glass pane 12, which forms the insulating layer 18. Some of the openings 44 are also configured as sealing or exhaust openings. Optionally, the openings may also be formed in the region of the frame 38. After having filled the gap 42 with foam, the upper mold 36 is removed to the top such that the unit composed of the glass pane 12 and the insulating layer 18 is produced. In FIGS. 5 and 6, the ceramic layer 48 is also shown with a thick line.

FIG. 6 also shows a lower mold half 50 and an upper mold half 52 which delimit a cavity 54 along with the unit inserted therein and composed of the glass pane 12 and the insulating layer 18, the cavity being filled by injection molding or foaming, more specifically with PUR material. The PUR material then forms the frame.

FIG. 6 does not show the regions of the tool in which the reinforcing parts 16 are positioned which are directly embedded into the PUR material upon insert molding or foam surrounding.

FIG. 6 clearly shows that one of a plurality of runner points and ventilation points 56 is not provided laterally in the region of the side face 15 but on the inside of the glass pane 12 which also faces upwards in the tool of FIG. 6. Upon demolding, the PUR drop present in the corresponding opening 58 in the upper mold half 52 detaches from the remaining PUR foam cured in the meantime, such that the runner points and/or the ventilation points do not project outwards.

A mechanical chip-forming machining is no longer necessary, in particular not in the region of the outwardly facing side face of the produced frame, either.

After the manufacture of the frame 14, all runner points and ventilation points 30, 31 preferably remain uncovered, i.e. they are not surrounded with foam or by injection molding or painted or covered by other parts.

The invention claimed is:

1. A vehicle roof glass element, having an exterior glass pane and a transparent insulating layer foamed on the inside onto the glass pane, and a circumferential frame which is provided on the interior rim portion of the glass pane and applied thereon by injection molding or foaming and which extends up to the rim, characterized in that all runner points and ventilation points of the frame are provided on the inside, and characterized in that the frame is mechanically unmachined.

2. The vehicle roof glass element according to claim 1, characterized in that the transparent insulating layer at least covers the entire surface of a see-through area of the glass pane in which the finished glass element is transparent.

3. The vehicle roof glass element according to claim 1, characterized in that a ceramic layer is applied on the inside onto the glass pane below the entire rim portion.

4. The vehicle roof glass element according to claim 1, characterized in that a primer and/or activator layer is provided between the glass pane and the transparent insulating layer.

5. The vehicle roof glass element according to claim 1, characterized in that the glass pane is a single-pane safety glass.

6. The vehicle roof glass element according to claim 1, characterized in that the glass pane has a circumferential side face which faces outwards and is entirely covered by the frame.

7. The vehicle roof glass element according to claim 1, characterized in that at least one prefabricated reinforcing part, in particular a reinforcing part of metal is embedded into the frame.

8. The vehicle roof glass element according to claim 7, characterized in that the reinforcing part is configured without distance piece towards the glass pane and without direct contact with the glass pane.

9. The vehicle roof glass element according to claim 1, characterized in that the insulating layer and a ceramic layer are directly applied in sections onto the glass pane.

10. A method of manufacturing a vehicle roof glass element, having an exterior workpiece-side glass pane and a transparent insulating layer foamed on the inside onto the workpiece-side glass pane and a circumferential frame which is provided on the interior rim portion of the workpiece-side glass pane and applied by injection molding or foaming according to claim 1, characterized by the following steps:
   a. positioning the workpiece-side glass pane onto a lower tool piece,
   b. closing the tool by an upper mold which is formed by a tool-side glass pane at least in sections and has at least the camber geometry of the inserted workpiece-side glass pane at least in the region of the insulating layer which is to be applied thereon, and
   c. foaming a transparent insulating material in a planar manner onto the inside of the workpiece-side glass pane so as to form a continuous transparent insulating layer at least in a see-through area of the vehicle roof glass element.

11. The method according to claim 10, characterized in that no primer is used for applying the frame by injection molding or foaming and/or in that an activator is deposited on the inside of the workpiece-side glass pane prior to the foaming of the transparent insulating layer.

12. The method according to claim 10, characterized in that after the manufacture of the transparent insulating layer, a circumferential frame is applied by foaming or injection molding, all runner points and ventilation points for the material to be introduced being provided in the region of the rim portion of the inside of the workpiece-side glass pane during injection molding or foaming.

13. The method according to claim 10, characterized in that a chip-forming post-processing of the vehicle roof glass element no longer takes place after the manufacture of the frame.

14. The method according to claim 10, characterized in that all runner points and ventilation points are not covered after the manufacture of the frame.

15. A foaming tool for executing the method according to claim 10, having a lower tool part and an adjoining upper mold, a workpiece-side glass pane being adapted to be inserted between the lower tool part and the upper mold into a cavity formed between the tool part and the mold, at least sections of the upper mold being formed by a tool-side glass pane which in particular at least in the region of the insulating layer to be applied has the same camber geometry as the tool-side glass pane which is to be inserted into the lower mold and is to be surrounded with foam.

16. The vehicle roof glass element according to claim 2, characterized in that a ceramic layer is applied on the inside onto the glass pane below the entire rim portion.

17. The vehicle roof glass element according to claim 2, characterized in that a primer and/or activator layer is provided between the glass pane and the transparent insulating layer.

18. A vehicle roof glass element, having an exterior glass pane and a transparent insulating layer foamed on the inside onto the glass pane, and a circumferential frame which is provided on the interior rim portion of the glass pane and applied thereon by injection molding or foaming and which extends up to the rim, characterized in that all runner points and ventilation points of the frame are provided on the inside, and characterized in that the insulating layer is a PUR layer with a reflow effect.

19. A vehicle roof glass element, having an exterior glass pane and a transparent insulating layer foamed on the inside onto the glass pane, and a circumferential frame which is provided on the interior rim portion of the glass pane and applied thereon by injection molding or foaming and which extends up to the rim, characterized in that all runner points and ventilation points of the frame are provided on the inside, and characterized in that the insulating layer extends up to the rim of the glass pane.

* * * * *